Figure 4:
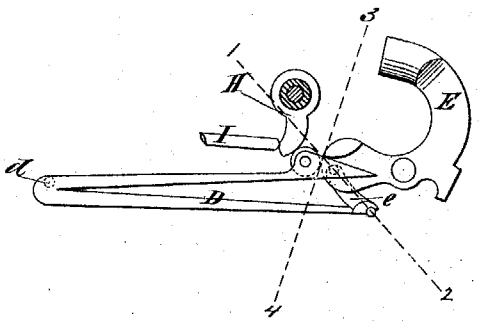

2 Sheets—Sheet 1.
F. BEESLEY,
Assignor to J. PURDEY.
BREECH LOADING FIRE ARMS.
No. 10,281. Reissued Feb. 6, 1883.
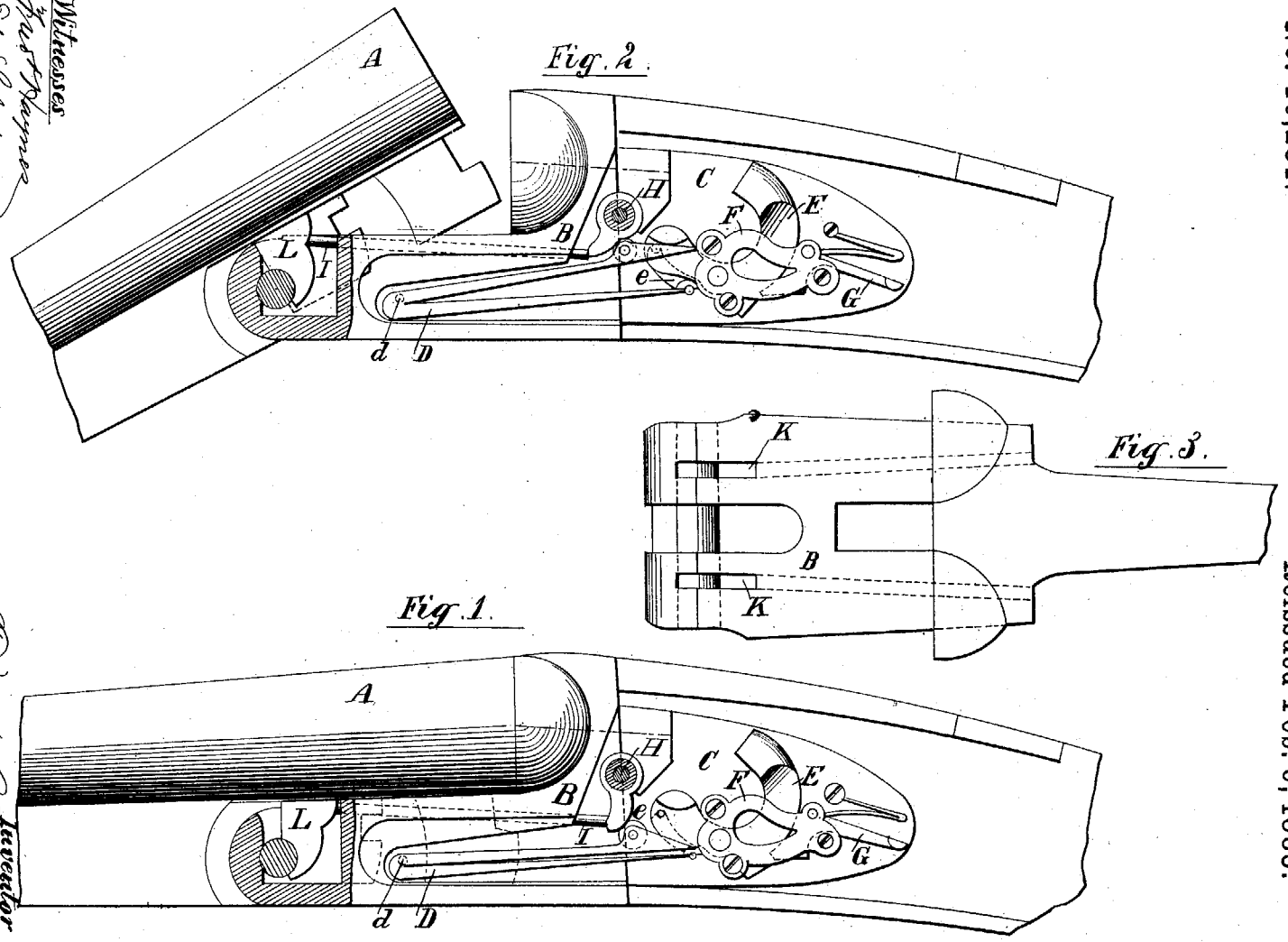
Witnesses
Jas. Haynes
Ed. Glatzmayer
Inventor
Frederick Beesley
by his Attorneys
Brown & Brown
N. PETERS, Photo-Lithographer, Washington, D. C.

2 Sheets—Sheet 2.

F. BEESLEY,

Assignor to J. PURDEY.

BREECH LOADING FIRE ARMS.

No. 10,281. Reissued Feb. 6, 1883.

Witnesses:
Geo. Haynes
Ed. Horan

Inventor:
Frederick Beesley
by his Attorneys
Brown & Brown

N. PETERS, Photo-Lithographer, Washington, D. C.

UNITED STATES PATENT OFFICE.

FREDERICK BEESLEY, OF QUEEN STREET, EDGWARE ROAD, COUNTY OF MIDDLESEX, ASSIGNOR TO JAMES PURDEY, OF OXFORD STREET, COUNTY OF MIDDLESEX, ENGLAND.

BREECH-LOADING FIRE-ARM.

SPECIFICATION forming part of Reissued Letters Patent No. 10,281, dated February 6, 1883.

Original No. 250,189, dated November 29, 1881. Application for reissue filed January 17, 1882. Patented in England January 3, 1880, No. 31, and in Belgium September 20, 1880, No. 52,603.

*To all whom it may concern:*

Be it known that I, FREDERICK BEESLEY, of Queen Street, Edgware Road, in the county of Middlesex, England, have invented certain new and useful Improvements in the Locks of Breakdown Guns, (for which I have obtained Letters Patent of the Government of Great Britain, No. 31, dated January 3, 1880, and a Brevet d'Invention of the Government of Belgium, No. 52,603[B], dated September 20, 1880,) of which the following is a specification.

The object of this invention is to improve the action of self-cocking "breakdown" guns, and also to render it impossible for the hammers to drop while the gun is open, (even though they should be released from the "sears,") by reason of the mainsprings being rendered powerless so long as the gun is open.

In carrying out my invention I use a mainspring constructed on the principle of that described in the specification of an English patent granted to John Stanton, and bearing date February 9, 1867, No. 367, the "stand side" of which spring is elongated to serve as a cocking-spring. The stand side of this spring, in the case of forward-action locks, I cause to bear on the tail end of the tumbler, and while thus bearing upon it the other end of the mainspring, which is connected, as usual, to the hammer, is powerless to act, the extension-piece pressing up against the tail end of the tumbler. This state of things occurs when the gun is open or the barrels are dropped. So soon, however, as the barrels are raised into position and the gun is closed the stand side of the mainsprings will be depressed clear of the tail of their respective hammers, the springs will be cramped, and they will thereby regain their power for throwing down the hammers.

In carrying out my invention I have found that the principle of action admits of embodiment in various forms, both as respects the cramping of the mainsprings and the cocking of the hammers, according to whether the invention is applied to a "forward" or a "back" action lock.

In the accompanying drawings, Figures 1 and 2 show in partial side elevation a breakdown double-barreled gun fitted with forward-action locks according to my invention, Fig. 1 showing the barrels in a locked position and Fig. 2 as dropped for recharging. Fig. 3 is a plan view of the breech-block detached from the gun; and Fig. 4 is a side elevation of the hammer, the spring, and other parts, showing the position of the same after the gun is fired and before the barrels are dropped.

A are the barrels, pivoted, as usual, to the breech-block or "action" B. The mechanism for locking the barrels is omitted from the drawings, as it has no reference to the present invention.

C indicates the lock plate, one only being shown in the drawings.

D is the mainspring, pivoted to the lock-plate C at *d*, and connected at the end of its lower arm or side, permanently, by a link or swivel, *e*, to the hammer E, which hammer is pivoted, as usual, to the lock-plate.

F is the bridle-piece, which carries the inner end of the pivot-pin of the hammer, and also the inner end of the pivot-pin of the sear G.

Above the extremity of the so-called "stand side" of the mainspring D, which in this instance is the lower arm or side, and in contact therewith, is a tumbling-lever or cramping-piece, H, which is recessed into and pivoted to the lock-plate C. This tumbling-lever receives a rocking motion from the thrust of a horizontal sliding rod, I, which fits loosely in a hole drilled longitudinally through the breech-block (see Fig. 5) and terminates in a recess, K, in the breech-block, made to receive a cam mounted loosely on the hinge-pin of the gun. This cam (one for each lock) is shown at L, Figs. 1 and 2. As the gun is closed by the raising of the barrels into line the cams L will be rocked by the pressure of the barrels upon a flat portion of their periphery. The increased radius of the cams, being thus brought up into contact with the forward ends of their respective rods I, will thrust back the rods and cause them to rock the tumbling-levers H, thereby depressing and holding down the stand side of the mainsprings D. By this forcible depression of the stand side of the mainspring the other end of the mainspring, or that which is linked to the hammer, will be free to answer to the action of the trigger, the barrels being at this time securely locked in place. After the firing of the gun the hammers will remain down; but so soon as the gun is unlocked and the barrels are dropped the sliding rods I, being released from the pressure of the cams L on the hinge-pin, will withdraw their pressure from the tumbling-levers H and allow the stand ends of the springs to rise into contact with the tail ends of the tumblers, when the rebound of the hammers will take place, the parts taking the position shown in Fig. 2.

Having now set forth the nature of my invention, I wish it to be understood that I claim—

1. The combination, with the barrel and the hammer of a breakdown gun, of a pivoted mainspring, one side or arm of which is connected with the hammer for the purpose of firing, and constructed, substantially as described, so as to cock the hammer, the other side of the spring being arranged to exert its pressure upon the hammer in the opposite direction to the first-named side or leaf, and a cramping-piece between the barrel and the spring for the purpose of bearing on the latter when the barrel is closed, substantially as described.

2. In a self-cocking breakdown gun, a cam, L, in the breech-block, actuating, through a sliding rod, I, the tumbler-lever H, which bears upon the stand side of the mainspring for the purpose of cramping the mainspring by the act of closing the gun, (whereby the spring is made effective for firing the gun,) such spring, when uncramped, on the opening of the gun, being free to cock the hammer, substantially as herein described.

FREDK. BEESLEY.

Witnesses:
H. K. WHITE,
GEO. CANTLE,
*Both of* 66 *Chancery Lane, London.*